United States Patent [19]

Kearsley et al.

[11] Patent Number: 4,922,498

[45] Date of Patent: May 1, 1990

[54] LASERS

[76] Inventors: Andrew J. Kearsley, 11, Eaton Court, Water Eaton Road; Richard R. Lewis, 8 Boulter Street, both of Oxford; Graham A. Naylor, 40 Great Close Road, Yarnton, Oxfordshire, all of United Kingdom

[21] Appl. No.: 285,315

[22] Filed: Dec. 6, 1988

Related U.S. Application Data

[63] Continuation of Ser. No. 153,279, filed as PCT GB87/00388 on Jun. 5, 1987, published as WO87/07776 on Dec. 17, 1987, abandoned.

[30] Foreign Application Priority Data

Jun. 6, 1986 [GB] United Kingdom ................ 8613872

[51] Int. Cl.⁵ .............................................. H01S 3/10
[52] U.S. Cl. ......................................... 372/25; 372/95
[58] Field of Search ............................... 372/95, 25, 92

[56] References Cited

U.S. PATENT DOCUMENTS

| | | | |
|---|---|---|---|
| 4,426,707 | 1/1984 | Martin et al. | 372/95 |
| 4,446,559 | 5/1989 | von Bieren | 372/95 |
| 4,498,051 | 2/1985 | Hunter et al. | 372/95 |
| 4,646,314 | 2/1987 | Opower | 372/95 |

Primary Examiner—Léon Scott, Jr.
Attorney, Agent, or Firm—Spencer & Frank

[57] ABSTRACT

A pulsed laser system for generating light pulses or variable duration which includes a elongated member defining a laser discharge chamber having first and second ends, a gain medium disposed within the discharge chamber and means for stimulating pulse laser emission of the gain medium within the discharge chamber. A first reflector is positioned adjacent the first end of the discharge chamber, and a second reflector is positioned at a variable distance from the second end of the discharge chamber. By varying the distance of the second reflector from the second end of the discharge chamber, the duration of pulses emitting from the discharge chamber is varied.

6 Claims, 8 Drawing Sheets

LASERS

This application is a continuation of Ser. No. 153,279, filed as PCT GB87/00388 on Jun. 5, 1987 published as WO87/07776 on Dec. 17, 1987, now abandoned.

BACKGROUND OF THE INVENTION

Pulsed lasers, such as copper vapour lasers, will generally produce pulses of emitted laser light having a duration of the order of 30 nanoseconds (ns). For some applications e.g. picosecond pulse amplification applications, this is too long and, for such applications, it is desired to have pulses of shorter duration, of the order of 10 ns.

This invention relates to apparatus and a method of operating a pulsed laser so as to provide pulses of such shorter duration. The invention is applicable to pulsed lasers in which the gain medium undergoes a rapid transition from gain to absorption, e.g. a pulsed laser using copper vapour as its gain medium.

SUMMARY OF THE INVENTION

According to the invention there is provided a pulsed laser system comprising a laser device, an elongate member defining a laser discharge chamber for the laser device, a gain medium disposed in said chamber, means for stimulating pulsed laser emission of said gain medium in said chamber, first means and second means arranged to reflect the emitted pulse back into said chamber, the first means being positioned adjacent the chamber to reflect back to said chamber said emitted pulse, characterised in that the second means is spaced from said chamber to provide an extended path for the emitted pulse to travel, the second means being arranged to cause the emitted pulse to be reflected back to transit said chamber, whereby to produce a pulse of short time duration.

According to a feature of the invention there is provided a method of operating a pulsed laser system, which system comprising a laser device, an elongate member defining a laser discharge chamber for the laser device, a gain medium disposed in said chamber, means for stimulating pulsed laser emission of said gain medium in said chamber, first means and second means arranged to reflect the emitted pulse back into said chamber, the first means being positioned adjacent the chamber to reflect back to said chamber said emitted pulse, characterised in that the method comprises operating the laser device with the second means spaced from said chamber to provide an extended path for the emitted pulse to travel, and arranging the second means to cause the emitted pulse to be reflected back to transit said chamber whereby the system produces a pulse of short time duration.

BRIEF DESCRIPTION OF THE DRAWINGS

Embodiments of the invention will now be described, by way of example only, with reference to the accompanying drawings, in which.

DESCRIPTION OF THE PREFERRED EMBODIMENTS

Figure 1:
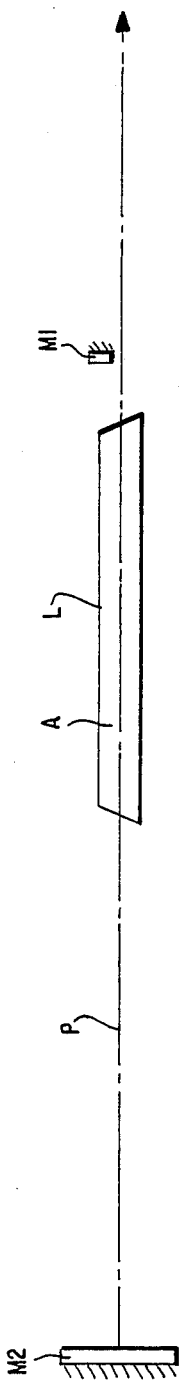
FIG. 1 is a diagram showing a laser system constructed in accordance with the invention.

In FIG. 1 there is shown a laser system comprising a laser device L which is caused to emit a pulse of stimulated light substantially along or substantially parallel to an axis A. Some of the pulse of light is reflected back by a small mirror M1, positioned somewhat off the centreline of the axis A, and this reflected light passes completely through the gain medium of the laser device L and out of the laser device to travel along an extended path P to a further mirror M2. This mirror M2 reflects the pulse of light back along path P so that it transits completely through the gain medium of the laser device and out of the laser device to exit the laser system as shown by arrow E.

In a pulsed laser the gain medium, which for example can be vapourised copper, is excited to an upper laser energy level and, whilst at this level, will excite, amplify and emit a pulse of light. After a time period, known as the lifetime of the upper laser level, the medium reverts from high gain to strong absorption. With the arrangement of the invention shown in FIG. 1 a light pulse of high amplitude but short time duration is produced. Although it is difficult to be completely certain as to what mechanism produces this pulse of short time duration and high amplitude, there are two possible explanations:

(1) The long transit along extended path P to mirror M2 and back causes the pulse to return through the laser discharge chamber at a time when the laser medium is just becoming highly absorptive. The beginning of the pulse passes through the chamber when the gain medium is still providing high gain and thus is further amplified. However, the tail of the pulse passes through when the medium changes to absorption and is absorbed and this shortens the pulse by absorbing its trailing end, or, (2) Conventional laser arrangements with mirrors positioned close to each end of the cavity, cause the light pulse to make several round trips of the chamber so that pulses emerge on each trip and this produces an output having multiple peaks closely spaced in time and which is relatively long in duration. However, in the present invention the amplified spontaneous emission has a single sharp peak at the start of the pulse due to an initially high gain in the lasing medium. It is this peak which is amplified to produce the short laser pulse and because one mirror is spaced an extended distance from the chamber, the arrangement does not allow the light pulse to make multiple trips around the chamber and thus a short duration pulse is produced.

Using the small mirror M1 to provide reflection of the light pulse for the second transit through the lasing medium, ensures a narrow source for the light and gives good collimation of the light pulse. In addition, the lasing material in the outer margins of the discharge chamber gives a higher amplification earlier (rather than later) in the time period that the medium is in gain, than that provided by the material along the centreline and, because the light reflected from mirror M2 passes through the chamber slightly off the centreline, it receives better this amplification.

Figure 2:
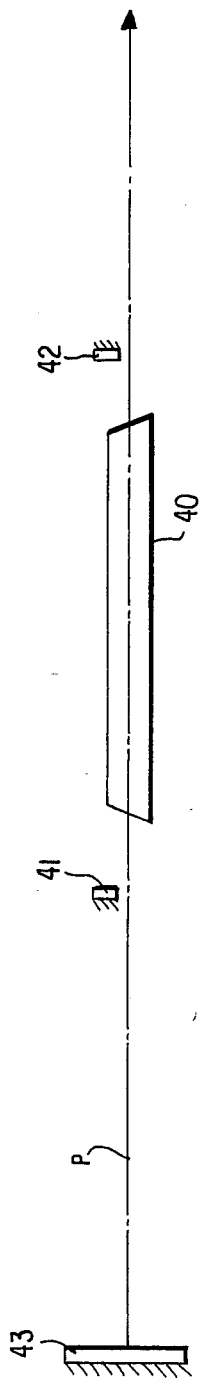
FIG. 2 is a longitudinal section through a laser system constructed in accordance with the invention.

In FIG. 2 the laser device has an elongate discharge chamber formed by a ceramic tube 10. Discharge is generated in tube 10 between a first electrode 11 at one end of tube 10 and a second electrode 12 at the other end. The electrodes 11, 12 are connected to a power supply system, which is not illustrated.

The power system generates a pulsed discharge in the tube at a repetition rate of the order of 5 kHz. Upon start up the discharge gradually heats up the tube 10 until the lasing material, which may be copper metal resident in the chamber, is vapourised and the metal vapour can then be made to lase.

The laser output is in the form of a pulse of light which travels along the tube 10 from the centre towards both ends. At one end the pulse of light passes out through a transparent window 13 and some of this light is reflected back by a first reflecting means in the form of a mirror 14 positioned off the centreline of the laser. As with the example of FIG. 1, the reflected light passes through the gain medium at the outer margins of the discharge chamber and thus passes through that part of the gain medium material which will provide the highest gain.

At the other end the pulse of light passes out through another transparent window 15. It is then reflected through 90° in turn by each of two high reflectivity mirrors 16, 17 which turn the light pulse through a total of 180° towards a further high reflectivity mirror 18, along an extended path P. The mirror 18, which forms the second reflecting means, reflects the light pulse back along the path P so that it is again reflected in turn by mirrors 16,17 through a total of 180°.

The light then passes into and through the discharge chamber 10 and then the majority of it passes out through window 13 to form the output of the laser device.

As the light pulse now passes back through the discharge chamber the gain medium (the copper vapour) is in course of undergoing transition from the excited high gain state to absorption.

As described above, it is thought that the leading portion of the pulse is amplified in the gain medium, which is still in the excited high gain state, but the trailing portion of the pulse, which passes through the gain medium as the transition to absorption occurs, is attenuated. Whatever the mechanism which causes this phenomenon it has been found that by adjusting the position of the mirror 18 so as to vary the distance the pulse travels from the discharge chamber to mirror 18 and back along path P, so the amount of the pulse which receives amplification and the amount which is attenuated, can be varied.

Figure 3:
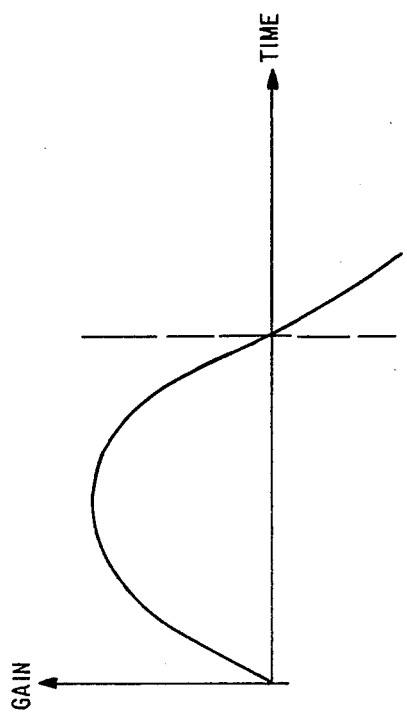
FIGS. 3 to 5 are plots of gain of the gain medium and output amplitude of the pulse with time of the laser system of FIG. 2.
Figure 4:
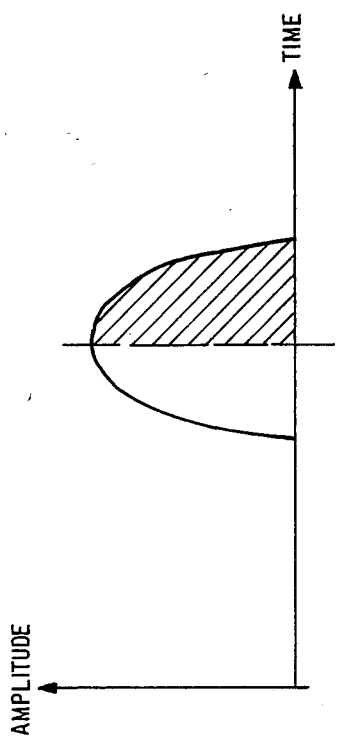

In FIG. 3 the gain of the gain medium is shown against time. As the discharge is initiated the gain rises and then it falls. The relative timing of the return of the light pulse through the chamber is shown in FIGS. 4 and 5.

Figure 5:
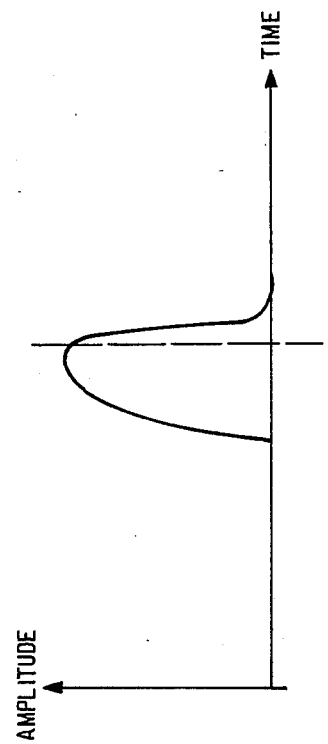

As the gain changes to absorption, it is thought that, as described above, as the pulse passes through the chamber, the leading portion is amplified but the trailing portion (shown in hatching in FIG. 4) is attenuated, producing an output pulse of the shape shown in FIG. 5.

By causing the pulse to arrive sooner or later more or less of the tail of the pulse is attenuated and this is done by varying the length of path P which, in turn, is done by moving the mirror 18 along path P. Thus the output pulse duration can be simply adjusted by changing the position of the mirror along path P.

Turning now to consider the detailed construction of the laser device, the discharge tube 10 and thermal insulation 20, 21 are supported within a cylindrical vacuum jacket 24 which seats against 'O' rings 25 and 26 located in annular recesses in the end plate members 27, 28.

These end plate members are secured as by screws (not shown) so as to compress 'O' rings 25, 26 against the vacuum jacket 24.

A cooling jacket 30 is mounted around the vacuum jacket 24, the jacket consisting of a flanged cylinder having tubular coils 31 wound helically around the outside. The coils are brazed to the jacket 31, so as to make good thermal contact therewith and the coils carry a cooling medium, such as water. The windows 13, 15 are sealed to end plate members 27, 28 respectively by 'O' rings 32, 33 so as to complete the vacuum chamber.

Figure 6:
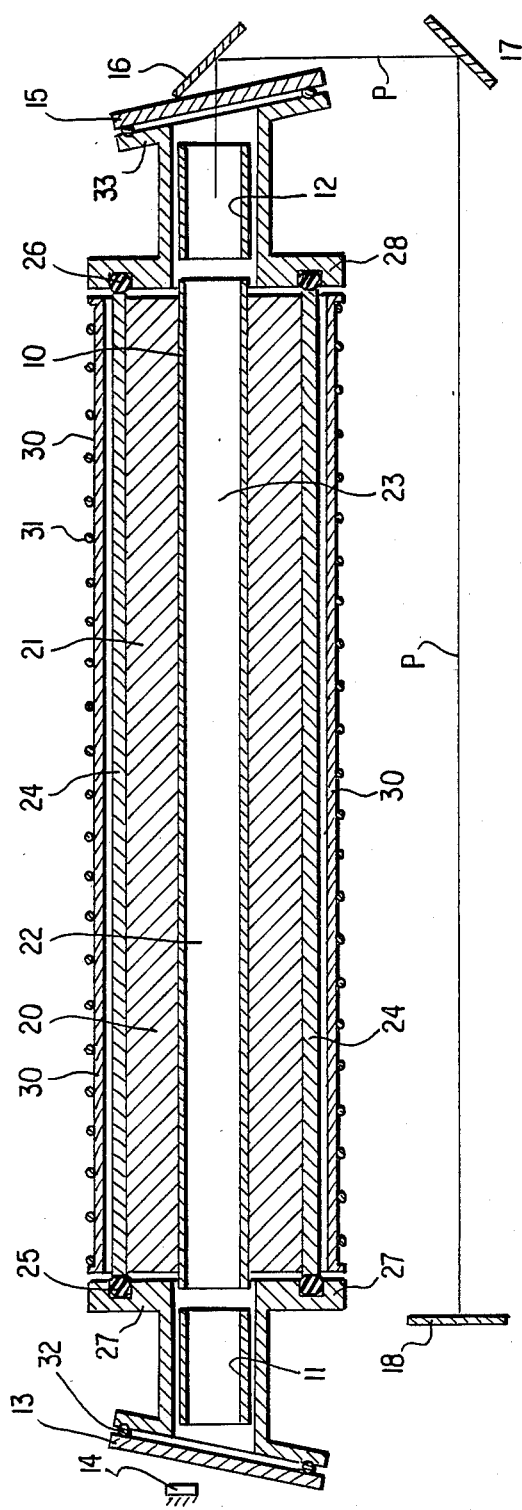
FIG. 6 is a diagram of a further embodiment of the invention, and, FIGS. 7 and 8 are graphs of emitted pulse amplitude against time.

Referring now to FIG. 6, there is shown a laser system comprising a laser device 40 which generates and emits from each end an amplified spontaneous emission in the form of a light pulse. Part of the pulse of light is reflected by reflecting means in the form of a pair of small mirrors 41, 42.

Mirror 41 lies normal to the axis of the device 40 and reflects the light back through the outer margins of the gain medium to receive the highest amplification, as described above. This light pulse is then reflected again back through the device 40, again through the outer margin of the gain medium to receive further amplification by mirror 42. Mirror 42 has its reflecting surface offset slightly from normal so that the reflected light passes out through the device 40, missing mirror 41, towards further reflecting means in the form of a mirror 43 along an extended path P. The pulse is reflected and travels back from mirror 43 to make a further transit right through device 40 and then to exit the laser system as an output pulse E.

Figure 7:
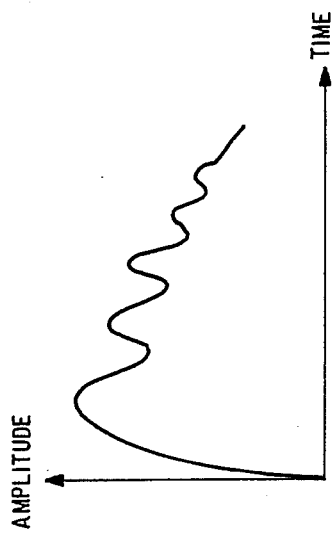
Figure 8:
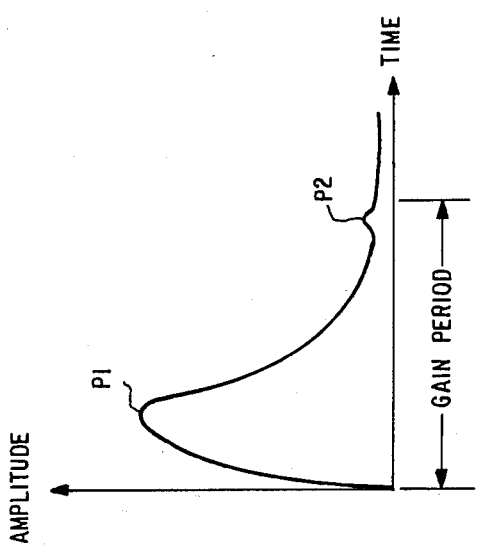

FIGS. 7 and 8 each show the amplitude of an emission pulse against time. In FIG. 7 a normal pulse is shown, as described above, having multiple peaks caused by multiple reflections between mirrors spaced closely to each end of a discharge chamber. However, in FIG. 8, the peak P1 forms the initial pulse which is emitted from the laser device 40 and is reflected by mirrors 41 and 42 and then travels along extended path P to mirror 43 and back as described above. A second peak P2 may be caused by peak P1 reflecting back off mirror 42 all the way to mirror 43 and back but this arrives back at the device 40 from mirror 43 too late to be amplified by the gain medium and is substantially attenuated as shown in FIG. 8.

We claim:

1. A pulsed laser system for generating light pulses of variable duration, comprising:

an elongate member defining a laser discharge chamber having first and second ends;

a gain medium disposed within said discharge chamber;

means for stimulating pulsed laser emission of said gain medium within said discharge chamber, said pulsed laser emission producing light pulses which travel toward the first and second ends of said discharge chamber;

a first reflector means positioned off the centerline of the laser and adjacent the first end of said discharge chamber for reflecting some of said light pulses back into said gain medium; and a second reflector positioned at a variable distance from the second end of said discharge chamber, said variable distance being greater than the distance said first reflector is positioned from the first end of said discharge chamber such that adjusting a position of said second reflector means varies the amount of the pulse which receives amplification and the amount of the pulse which is attenuated thereby producing short duration high gain pulses.

2. A pulsed laser system as claimed in claim 1 wherein said discharge chamber has a longitudinal axis extending in the direction of propagation of said light pulses, and wherein said first reflector is positioned to one side of said axis, whereby part of the light reflected by said first reflector is reflected back to said discharge chamber.

3. A pulsed laser system as claimed in claim 2 wherein a third reflector is interposed between said second reflector and the second end of said discharge chamber, said third reflector being positioned to one side of said axis, whereby part of the light reflected by said third reflector is reflected back to said discharge chamber.

4. A pulsed laser system as claimed in claim 3 wherein a reflecting surface of said first reflector is offset from a perpendicular to said longitudinal axis and a reflecting surface of said third reflector is positioned perpendicular to said axis.

5. A pulsed laser system as claimed in claim 1 wherein mirror means is interposed between said second reflector and the second end of said discharge chamber, light propagated from the second end of said discharge chamber being reversed in direction by said mirror means before impinging on said second reflector, said second reflector reflecting said light back to said discharge chamber.

6. A method of operating a pulsed laser system for generating light pulses of variable duration including an elongate member defining a laser discharge chamber having first and second ends, a gain medium disposed within said discharge chamber, means for stimulating pulsed laser emission of said gain medium within said discharge chamber, a first reflector positioned adjacent the first end of said discharge chamber, and a second reflector positioned at a distance from the second end of said discharge chamber, said distance being greater than the distance said first reflector is positioned from the first end of said discharge chamber, comprising the steps of:
stimulating pulsed laser emission of said gain medium within said discharge chamber; and
varying the distance of said second reflector from the second end of said discharge tube to change the duration of said light pulse.

* * * * *